United States Patent [19]

Fry

[11] 4,126,061
[45] Nov. 21, 1978

[54] SIGNAL FAILURE CIRCUIT FOR AUTOMATIC TRANSMISSIONS

[75] Inventor: Richard L. Fry, London, England

[73] Assignee: Lucas Industries Limited, Birmingham, England

[21] Appl. No.: 760,576

[22] Filed: Jan. 19, 1977

[30] Foreign Application Priority Data

Jan. 31, 1976 [GB] United Kingdom ............... 3885/76

[51] Int. Cl.² ............................................. B60K 41/18
[52] U.S. Cl. .................................................... 74/866
[58] Field of Search .......................................... 74/866

[56] References Cited

U.S. PATENT DOCUMENTS

| | | | |
|---|---|---|---|
| 3,732,755 | 5/1973 | Beig et al. | 74/866 |
| 3,937,108 | 2/1976 | Will | 74/866 |
| 3,961,546 | 6/1976 | Gilmore et al. | 74/866 |
| 4,044,634 | 8/1977 | Florus et al. | 74/866 |

FOREIGN PATENT DOCUMENTS 2,447,860 10/1974 Fed. Rep. of Germany ............ 74/866

Primary Examiner—Samuel Scott
Assistant Examiner—Lance W. Chandler
Attorney, Agent, or Firm—Holman & Stern

[57] ABSTRACT

A signal failure circuit for incorporation in a control circuit of vehicle automatic transmission system of the type having a generator which produces a fluctuating signal, comprises an interval timer including a comparator and a capacitor, the latter being charged by means of a charging circuit and discharged by means of a transistor which is rendered conductive by pulses of a pulse train derived from said fluctuating signal. When said pulses cease the comparator provides an output to a monostable circuit which thereby switches to its unstable state to activate safety circuits associated with the transmission system. The monostable circuit will remain in its unstable state for a predetermined time after the return of the pulses of the pulse train. The charging circuit of the capacitor is conveniently controlled by a further transistor the conduction of which is dependent upon the output voltage of an a.c.-d.c. converter which also receives said train of pulses.

13 Claims, 2 Drawing Figures

SIGNAL FAILURE CIRCUIT FOR AUTOMATIC TRANSMISSIONS

This invention relates to a signal failure circuit for incorporation in a control circuit of a vehicle automatic transmission system, the control circuit including switch circuits operable to effect engagement of respective gear ratios of the transmission in response to an input signal which varies in accordance with the speed of the output shaft of the transmission and which is derived from a generator which produces a fluctuating signal the frequency of which varies with the speed of the output shaft.

One of the problems with the type of control circuit set out above is that failure of the generator or its associated circuits can result in the control circuit effecting selection of the ratio of the gearbox which gives a higher or the highest engine speed for a given road speed of the vehicle. Such selection is undesirable since it may lead to damage of the transmission or the vehicle engine.

It has been proposed to provide a signal failure circuit which is responsive to the loss of output of the generator. The signal failure circuit acts through a safety circuit to inhibit ratio changes which would result in an increased engine speed for a given road speed, or to effect a change to neutral, or to inhibit any ratio change if the signal is lost for a predetermined time interval. To protect against intermittent faults this time interval must be as short as possible but this does increase the possibility of the signal failure circuits being activated during heavy braking when the output shaft may be locked or by mechanical backlash in the transmission.

The object of the present invention is to provide a signal failure circuit for incorporation in a control circuit of the kind specified in a simple and convenient form.

According to the invention a signal failure circuit for the purpose specified comprises an interval timer which provides an output in the event that the signal from the generator falls to zero for longer than a first predetermined time and a monostable circuit responsive to the output from the interval timer and which is switched by said output to its unstable state to activate a safety circuit in the control circuit, said monostable circuit remaining in its unstable state for a second predetermined time after the output from the interval timer has disappeared.

One example of a signal failure circuit will now be described with reference to the accompanying drawings in which.

Figure 1:
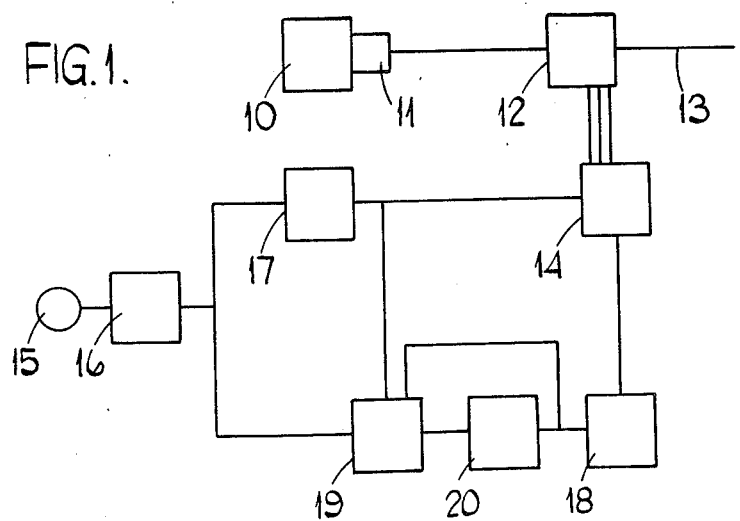
FIG. 1 is a diagrammatic layout of a vehicle transmission system.

Referring to FIG. 1 of the drawings there is provided an engine 10 which through a fluid coupling 11 is coupled to a multi-ratio gearbox 12. The gearbox 12 has an output shaft 13 which is connected to the normal drive axle of the vehicle. The gearbox 12 is controlled by a control circuit 14 which provides signals at appropriate times, to solenoids incorporated in the gearbox and which when energised effect engagement of a respective gear-ratio.

A signal depending upon the road speed of the vehicle is provided by an alternating current generator 15 and conveniently this is connected to the output shaft 13 of the gearbox. The alternating current signal provided by the generator is applied to a pulse shaper circuit 16 and the output from this circuit passes to a frequency to voltage converter 17 of the integrating type. The converter 17 produces a d.c. signal the amplitude of which is representative of the vehicle speed and this d.c. signal is supplied to the control circuit 14 so that ratio changes can be effected at the correct time. In general as the vehicle speed decreases the control circuit will cause selection of gear-ratios so as to maintain the engine speed.

With such an arrangement if the signal from the generator should disappear then the d.c. voltage from the converter 17 will gradually fall to zero indicating to the control circuit 14 that the vehicle speed has also fallen to zero. As a result the control circuit will effect a change in the gear-ratio in a direction which results in increasing engine speed for a given road speed. As a result damage may occur to the transmission and also to the engine of the vehicle.

In order to avoid such damage a safety circuit 18 is provided and this is supplied with an output signal which is generated by a signal failure circuit so that in the event of signal failure the safety circuit 18 effects a control over the control circuit 14 either to prevent gear-ratio changes or to cause the gearbox to be placed in the neutral condition.

The disappearance of the pulse signal from the generator may be occasioned by a fault in the generator itself or in the cable interconnecting the generator with the remaining portion of the circuit. Moreover, it will be appreciated that such faults may be of an intermittent nature only. It is still desirable however to detect intermittent faults and to take appropriate action. The detection of such faults is however made more difficult by the fact that during the use of the vehicle there may on occasions be a temporary loss of the signal from the generator. Such an instance occurs during braking when there may be momentary locking of the wheels connected to the output shaft 13 of the gearbox. Under such circumstances the control circuit 14 would effect a ratio change and this could be embarassing to the driver of the vehicle.

The signal failure circuit comprises a timer 19 which receives the signals from the shaping circuit 16 and in the event that the train of pulses from the shaping circuit 16 is missing for longer than a first predetermined time, provides an output to a monostable circuit 20 which when an output is received from the timer 19 switches to its unstable state to activate the safety circuit 18. The monostable circuit 20 remains in its unstable state for a second predetermined time after the output from the timer 19 has disappeared. Thus the signal failure circuit can reset itself so that if the fault is intermittent or there is a temporary loss of the pulse signal due to locking of the wheels, the transmission system will function normally again after the second predetermined time interval has lapsed. The choice of the first predetermined time is a matter of compromise since it must be remembered that the pulse frequency depends upon the speed of the vehicle and it is desirable to afford protection down to the lowest vehicle speeds and in particular down to the speed at which the control circuit 14 whould effect a change to the ratio of the gearbox which gives the highest engine speed for a given road speed. This in itself can lead to problems particularly during intermittent fault conditions and it is preferred to modify the first predetermined time in accordance with the output of the frequency to voltage converter 17. In this manner the circuit can be made to detect a single missing pulse at any road speed and the chances of the signal failure circuit resetting itself under intermittent fault conditions are reduced by increasing the ratio of the second predetermined time over the first predetermined time.

Figure 2:
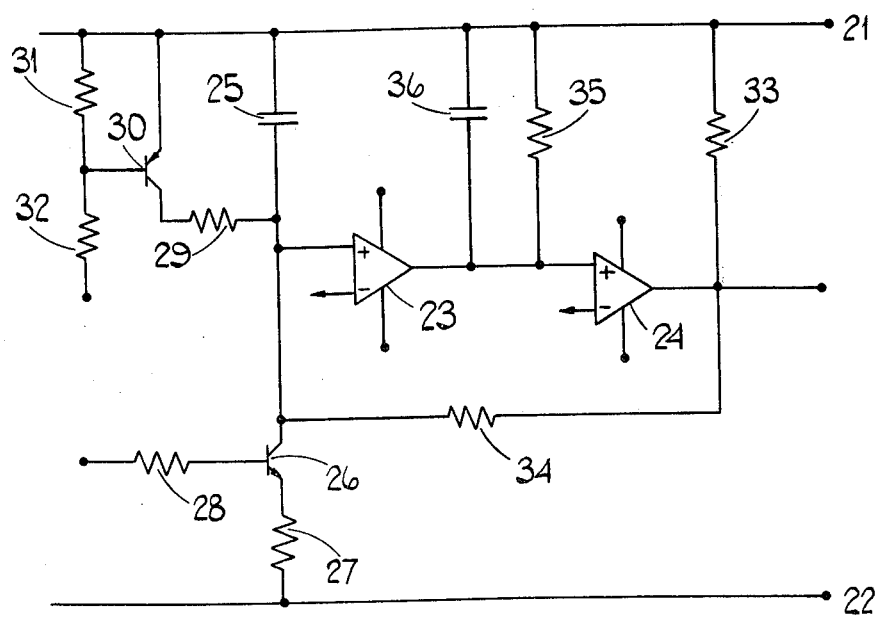
FIG. 2 is a circuit diagram showing a portion of the system shown in FIG. 1.

With reference now to FIG. 2 there are provided terminals 21 and 22 for connection to the positive and negative terminals of a source of d.c. supply. In addition a pair of comparators 23 and 24 are provided, these conveniently being integrated circuits which are powered from the supply terminals 21 and 22. Each comparator has an "open collector" output so that in their low output state a low impedance path is provided to the supply terminal 22 and in the high output state the path to the supply terminal 22 has a high impedance approaching an open circuit. One input of each of the comparators is connected to a reference voltage conveniently half the voltage appearing between the terminals 21 and 22. The other input of the comparator 23 is connected by way of a capacitor 25 to the terminal 21 and also to the collector of an npn transistor 26 having its emitter connected by way of a resistor 27, to the terminal 22. The base of the transistor 26 is connected by way of a resistor 28 to the output of the frequency to voltage converter 17, the resistor 28 serving to prevent the output of the frequency to voltage converter being altered in the event of failure of transistor 26.

The aforesaid other input terminal of the comparator 23 is also connected by way of a resistor 29 to the collector of a pnp transistor 30 having its emitter connected to terminal 21 and its base connected to terminal 21 by way of a resistor 31. In addition the base of transistor 30 is connected by way of a resistor 32 to the output of the pulse shaper 16.

The output of the comparator 23 is fed to the other input terminal of the comparator 24 and the output of the comparator 24 is connected by way of a resistor 33 to the terminal 21 and in addition to the other input of the comparator 23 by way of a resistor 34. Moreover, the output of the comparator 23 is connected to terminal 21 by way of a resistor 35 and a capacitor 36 connected in parallel. In use, capacitor 25 is charged so that said other input of the comparator 23 moves negatively, by way of the collector emitter path of the transistor 26. Negative pulses from the pulse shaper 16 whose on or low state time is small compared with its periodic time, switch on transistor 30 and thereby discharging capacitor 25 by way of resistor 29 and the collector emitter path of the transistor 30. When a pulse is absent however the capacitor 25 is able to charge to a value at which the comparator 23 produces a low output and the effect of this is that the capacitor 36 is charged and the monostable circuit constituted by the comparator 24, the capacitor 36 and the resistor 35 switches to its unstable state thereby to activate the safety circuit 18. The signal failure circuit will remain in this condition so long as pulses are missing however, in the event that the train of pulses returns the capacitor 25 will be discharged as previously described and the comparator 23 will no longer produce an output. The capacitor 36 however is discharged relatively slowly by the resistor 35 and therefore the monostable circuit will revert to its stable state only after a second predetermined time, the first predetermined time being the time required for the comparator 23 to produce an output after the last pulse of the train.

The rate of charge of the capacitor 25 is adjusted by controlling the current flowing in the collector emitter path of the transistor 26 and this of course is determined by the voltage at the output of the frequency to voltage converter 17. As this voltage increases with increasing speed, then the rate of charge of the capacitor 25 increases so that the first predetermined time is effectively reduced.

Resistor 34 ensures that in the situation where there is a complete loss of both the pulses from the shaper circuit and the output of the converter 17, the capacitor 25 will be charged so that the comparator 23 will maintain an output to the comparator 24 this in turn maintaining an output to the safety circuit 18. It will be understood that under conditions of complete loss of signal the output from the converter will gradually fall so that the circuit will initially operate as previously described.

At very low speeds the output of the converter 17 is very low so that the collector emitter current of the transistor 26 is also low. In this situation the capacitor 25 is not charged because the resistor 34 is effectively connected in series with the resistor 33 across the capacitor. The practical effect is that at low speeds the circuit is disabled, it being appreciated that the circuit becomes operative again as soon as the output of the converter has risen sufficiently to cause charging of the capacitor. The speed at which the circuit becomes operative again is arranged to be slightly greater than the speed at which the output from the converter appears. Moreover it will be understood that the disabling effect only occurs as the vehicle moves from rest or as the vehicle is gradually brought to rest.

The disabling effect does not occur if there is already an output from comparator 24 due to a loss of signal however caused, or if there is an output from the converter 17.

The function of the circuit when there is a loss of the pulse signal due to momentary locking of the transmission has been described but restated briefly, the capacitor 25 is charged but not discharged and the comparators 23 and 24 assume their low output states so that the safety circuit prevents gear changes. The circuit can also be made to respond to greater than normal deceleration of the vehicle when the brakes of the vehicle are applied but no locking of the transmission occurs. It will be understood that in this situation there may be partial locking of the transmission but not complete locking so that the pulse signal does not disappear completely. In order to ensure that the circuit inhibits gear changes in this situation, the time constant of the converter 17 must be carefully chosen in relation to the aforesaid first predetermined time.

By the arrangement described a signal failure circuit is provided which is capable of resetting itself after momentary failure of the signal from the generator 15 either due to an intermittent fault which has cleared itself or when the signal from the generator disappears due to momentary locking of the wheels connected to the output shaft of the gearbox.

I claim:

1. A signal failure circuit for incorporation in a control circuit of a vehicle automatic transmission system, the control circuit including switch circuits operable to effect engagement of respective gearratios of the transmission in response to an input signal which varies in accordance with the speed of the output shaft of the transmission and which is derived from a generator which produces a fluctuating signal the frequency of which varies with the speed of the output shaft, the signal failure circuit comprising:

an interval timer which provides an output in the event that the signal from the generator falls to zero for longer than a first predetermined time;

a monostable circuit responsive to the output from the interval timer and which is switched by said output to its unstable state to activate a safety circuit in the control circuit, said monostable circuit remaining in its unstable state for a second predetermined time after the output from the interval timer has disappeared; and means for modifying said first predetermined time in accordance with the output of a frequency to voltage converter which is supplied with said fluctuating signal, wherein said interval timer includes a capacitor, a charging circuit for said capacitor, means controlled by said fluctuating signal for discharging said capacitor and means responsive to the voltage developed across said capacitor for providing said output.

2. A signal failure circuit according to claim 1 in which the means for modifying said first predetermined time comprises a transistor in said charging circuit, conduction of said transistor being varied in accordance with the output of said frequency to voltage converter.

3. A signal failure circuit according to claim 2 including a resistor which is connected in parallel with said transistor when the monostable circuit is in its unstable state and in a circuit in parallel with said capacitor when the monostable circuit is in its stable state.

4. A signal failure circuit according to claim 3 in which said monostable circuit comprises a further capacitor, a further resistor connected in parallel with said capacitor and means responsive to the voltage developed across said capacitor for providing a further output to the safety circuit.

5. A signal failure circuit according to claim 4 in which the means responsive to the voltage developed across the capacitor and further capacitor comprises comparators respectively.

6. A signal failure circuit according to claim 5 in which said comparators each have one input terminal connected to a reference voltage.

7. A signal failure circuit according to claim 6 in which said comparators are of the open collector output type, said comparators being powered from a pair of D.C. supply terminals, the aforesaid reference voltage being substantially half the voltage between the supply terminals.

8. A signal failure circuit according to claim 7 in which one plate of each of said capacitors is connected to one of said supply terminals, the other plates of the capacitors being connected to the other input terminals respectively of said comparators.

9. A signal failure circuit according to claim 8 in which the collector emitter path of said transistor is connected between the other supply terminal and said other input terminal of the comparator associated with said first mentioned capacitor, said first mentioned resistor being connected between said other input terminal and the output of the comparator associated with said further capacitor.

10. A signal failure circuit according to claim 9 including a further resistor connected between the output of the comparator associated with the further capacitor and said one supply terminal.

11. A signal failure circuit according to claim 1 in which the means for discharging said capacitor comprises a transistor having its collector emitter path connected in a discharge circuit in parallel with said further capacitor.

12. A signal failure circuit according to claim 11 in which said discharge circuit includes a resistor.

13. A signal failure circuit according to claim 2 in which said frequency to voltage converter is of the integrating type.

* * * * *